(12) United States Patent
Tadic et al.

(10) Patent No.: US 6,270,001 B1
(45) Date of Patent: Aug. 7, 2001

(54) METHOD OF MANUFACTURING A PULLEY WITH INTEGRAL BEARING

(75) Inventors: Vedran Tadic, Tours (FR); Manfred Brandenstein, Eussenheim (DE); Johannes Van De Sanden, Nieuwegein (NL)

(73) Assignee: SKF France (FR)

( * ) Notice: Subject to any disclaimer, the term of this patent is extended or adjusted under 35 U.S.C. 154(b) by 0 days.

(21) Appl. No.: 09/521,998

(22) Filed: Mar. 9, 2000

(30) Foreign Application Priority Data

Mar. 26, 1999 (FR) .................................................. 99 03828

(51) Int. Cl.[7] ........................... B23K 31/02; B23K 26/00; B23K 13/01
(52) U.S. Cl. .......................... 228/245; 228/256; 228/258; 219/603; 219/615; 219/121.66
(58) Field of Search ...................... 228/245, 246, 228/258; 219/603, 615, 121.66

(56) References Cited

U.S. PATENT DOCUMENTS

| | | |
|---|---|---|
| 3,789,683 * | 2/1974 | Frost et al. . |
| 3,822,457 * | 7/1974 | Frost et al. . |
| 4,079,492 * | 3/1978 | Fromme . |
| 4,254,541 * | 3/1981 | St. John . |
| 4,402,678 * | 9/1983 | St. John . |
| 4,468,210 * | 8/1984 | McCutchan, Jr. . |
| 4,578,848 | 4/1986 | Dickson ........................... 29/149.5 |
| 4,861,317 * | 8/1989 | Brasse et al. . |
| 5,421,788 * | 6/1995 | Toth . |
| 5,453,053 * | 9/1995 | Danta et al. . |
| 5,528,706 | 6/1996 | Harimoto et al. ................... 384/573 |
| 5,675,202 * | 10/1997 | Zenmei et al. . |
| 5,862,592 | 1/1999 | Harimoto et al. ............. 29/898.067 |
| 6,068,241 * | 5/2000 | Meyer . |
| 6,200,513 * | 3/2001 | Emmett . |

FOREIGN PATENT DOCUMENTS

| | | |
|---|---|---|
| 2261459 * | 10/1975 | (FR) . |
| 2 532 865 | 3/1984 | (FR) . |
| 1342239 | 1/1974 | (GB) . |
| 359226721 * | 12/1984 | (JP) . |
| 02000234667 * | 8/2000 | (JP) . |
| 2000291786 * | 10/2000 | (JP) . |
| WO 98/34053 | 8/1998 | (WO) . |

* cited by examiner

Primary Examiner—Tom Dunn
Assistant Examiner—Kiley Stoner
(74) Attorney, Agent, or Firm—Smith, Gambrell & Russell, LLP

(57) ABSTRACT

A method is disclosed of manufacturing a pulley with integral bearing comprising a sheet metal pulley mounted on the outer race of a bearing. The pulley is a close sliding fit on the outer race. The interstice between the pulley and the race is at least partly filled with a low-melting-point filler metal which, when heated, melts and diffuses by capillary action into the interstice between the pulley and the race, at least partly filling the interstice and fastens the pulley to the race when it solidifies. The filler metal is advantageously a brazing alloy having a melting point much lower than that of the parts to be joined together. Applications of the method include the manufacture of belt tensioning pulleys with integral bearings, as used on automobile vehicle engines, for example.

8 Claims, 6 Drawing Sheets

METHOD OF MANUFACTURING A PULLEY WITH INTEGRAL BEARING

BACKGROUND OF THE INVENTION

1. Field of the Invention

The present invention relates to a method of manufacturing a pulley with integral bearing of the type comprising a sheet metal pulley mounted on the outer race of a bearing.

2. Description of the Prior Art

Pulleys with integral bearings of the above kind are used on automobile vehicle engines, for example, to tension a drive belt of an accessory of the engine.

Prior art tensioning pulleys with integral bearings of the above kind comprise a pulley mounted on the rotating outer race of a bearing and adapted to be pressed radially against a belt. The fixed inner race of the bearing is mounted on a support and an appropriate system, for example a cam system, enables the bearing, and therefore the pulley with the integral bearing, to be moved radially relative to the belt to adjust the tension in it.

The pulley is often made from pressed sheet metal, is in one or two parts and is generally a force fit on a cylindrical bearing surface consisting of the outside surface of the outer race of the bearing.

This method of mounting the pulley on the bearing causes problems due to possible modification of the geometry of the outer race of the bearing caused by force fitting the pulley on it.

Because of the method by which it is manufactured, neither the shape nor the dimensional tolerances of a pressed sheet metal pulley has a particularly high geometrical accuracy, compared to a bearing race which has been finish ground.

Force fitting the pulley on the bearing therefore causes a number of geometrical and dimensional modifications of the bearing, which can be summarized as follows:

a) Reduction of the internal radial clearance of the bearing between the balls and the raceways.

A relatively precise clearance, neither too large nor too small, is needed for the bearing to function correctly.

It is therefore necessary to use bearings which have a greater clearance than the standard clearance in order to compensate the effects of the reduced clearance.

Consideration might also be given to using bearings having a more massive outer race, of larger cross section, to limit the reduction of clearance due to force fitting, but this solution would be relatively costly because of the use of non-standard races.

b) Possible modification of the osculation, i.e. the ratio between the radius of curvature of the grooves of the raceways in a radial section plane passing through the axis of the bearing and the diameter of the balls.

With the radial clearance, the osculation is one of the parameters influencing the possibility of skewing of the bearing, i.e. possible tilting of the geometrical axis of the outer race relative to the geometrical axis of the inner race. This parameter must remain within a predetermined range of values if the tension pulley with integral bearing is to work correctly.

c) Introduction of out-of-round defects into the outer race of the bearing, which is prejudicial to correct working of the bearing and its service life.

Thus the various solutions considered above to the problem of eliminating or at least reducing geometrical and dimensional modifications caused by the usual procedure of force fitting a sheet metal pulley onto the outer race of the bearing are not entirely satisfactory.

It has also been proposed to glue a pulley to the outer race of a bearing, in particular a pulley molded from phenolic resin. However, to obtain a sufficiently strong bond between the pulley and the race, the pulley is heated and therefore expanded before it is fitted, and therefore shrinks when it cools, after it is fitted. Thus, even if very close tolerances are adhered to for the pulley and the outer bearing race, which necessarily increases the cost of the tension pulley with integral bearing, there remains the risk either of too great a clearance for a sufficiently strong adhesive bond to be obtained between the pulley and the race or of a clamping effect having the drawbacks already referred to in connection with force fitting the pulley onto the outer race of the bearing.

In an attempt to overcome these problems of fixing by gluing, WO-A-98/34053 proposes to fix a pulley, in particular a pulley molded from phenolic resin, to the outer race of a bearing by means of a molded bond obtained by injecting a molten material, for example a metal such as zinc, zinc alloy or lead or a plastics material such as polyamide, between the outer race of the bearing and the pulley which surrounds that race with an interstice or clearance of at least 0.5 mm between the two parts. This involves the use of means for centering the bearing relative to the pulley, special injection equipment and most importantly a specific injection mold for each size of bearing and pulley. What is more, the molded bond established in this way implies a particular conformation of the pulley and the outer race of the bearing, which rules out the use of standard bearings and pressed sheet metal pulleys.

This bonding method therefore cannot be used to manufacture pulleys with integral bearings at low cost.

The object of the present invention is to provide a method of manufacturing pulleys with integral bearings simply and at low cost and which remedies the drawbacks and problems of the prior art methods.

SUMMARY OF THE INVENTION

The invention provides a method of manufacturing a pulley with integral bearing comprising a sheet metal pulley mounted on the outer race of a bearing, in which method the pulley is a close sliding fit on the outer race and a filler metal is melted in the interface between the pulley and the race so that the filler metal diffuses by capillary action into at least part of the interstice, at least partly fills the interstice and fastens the pulley to the race when it solidifies.

For example, the filler metal can take the form of a ring of brazing wire occupying at least one end of the interface between the pulley and the race or of a coating applied to one of the parts to be assembled together.

For example, the filler metal can be melted by heating it with a laser beam or an electron beam, preferably impinging only on the filler metal, or by induction heating at least one of the parts to be assembled together, preferably the pulley.

In a preferred embodiment of the invention, the filler metal is a metal having a melting point that is very low compared to that of the steel from which the pulley and the race are made, for example an alloy based on tin or silver or an alloy of tin and silver.

The pulley can be a one-piece pulley and can take the form of a rim, i.e. a substantially cylindrical part, which comes into contact with the belt to be tensioned, possibly with the addition of external guide flanges on opposite sides. The pulley can instead take the form of a pulley in two symmetrical halves, for example, in which case each half can advantageously include a flat annular part forming a web, a substantially cylindrical outer annular part forming a half-rim and a substantially cylindrical inner annular part forming a half-hub and intended to be mounted on the outer race of the bearing, and if necessary there can be an outside flange on one of the two substantially cylindrical parts and an inside flange on the other one.

Embodiments of the invention will now be described in more detail with reference to the accompanying drawings.

DETAILED DESCRIPTION OF THE PREFERRED EMBODIMENTS

Figure 1:
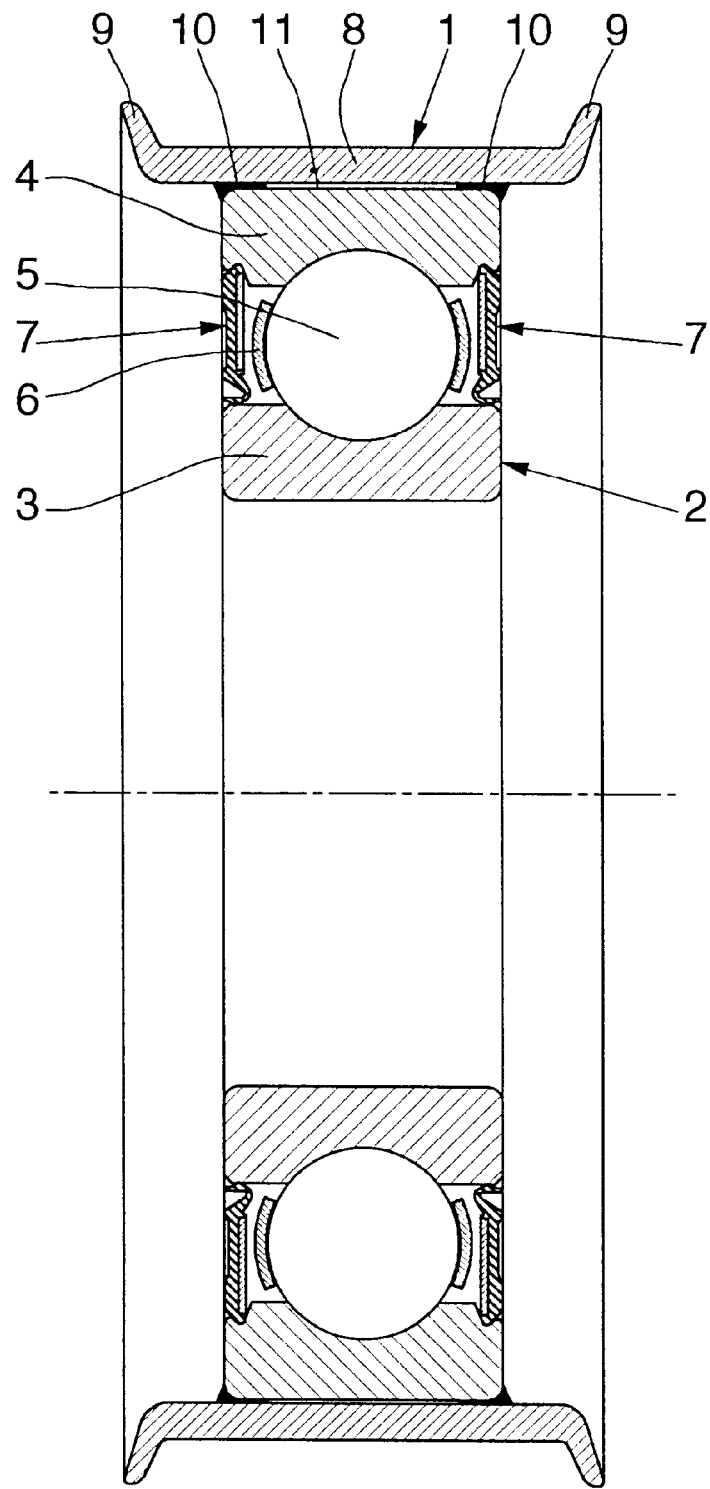
FIG. 1 is a view in axial section of a pulley with integral bearing for tensioning a belt, the pulley with integral bearing being manufactured by a method according to the invention.

A belt tensioning pulley with integral bearing shown in FIG. 1 includes a pulley 1 and a bearing 2, in this instance a ball bearing comprising an inner race 3, an outer race 4, a row of balls 5 held apart by a cage 6 between the two races 3 and 4 and two seals 7. The bearing 2 is a standard bearing.

The pulley 1 comprises a rim 8 with an outside flange 9 on each side.

The rim 8 is mounted on the outer race 4 of the bearing 2 with a very small clearance or with a close sliding fit and is fastened to the race 4 by two brazed beads 10, based on tin or silver, for example, one on each side, the brazed beads 10 filling the interstice 11 between the inside surface of the rim 8 and the outside surface of the race 4.

Figure 2:
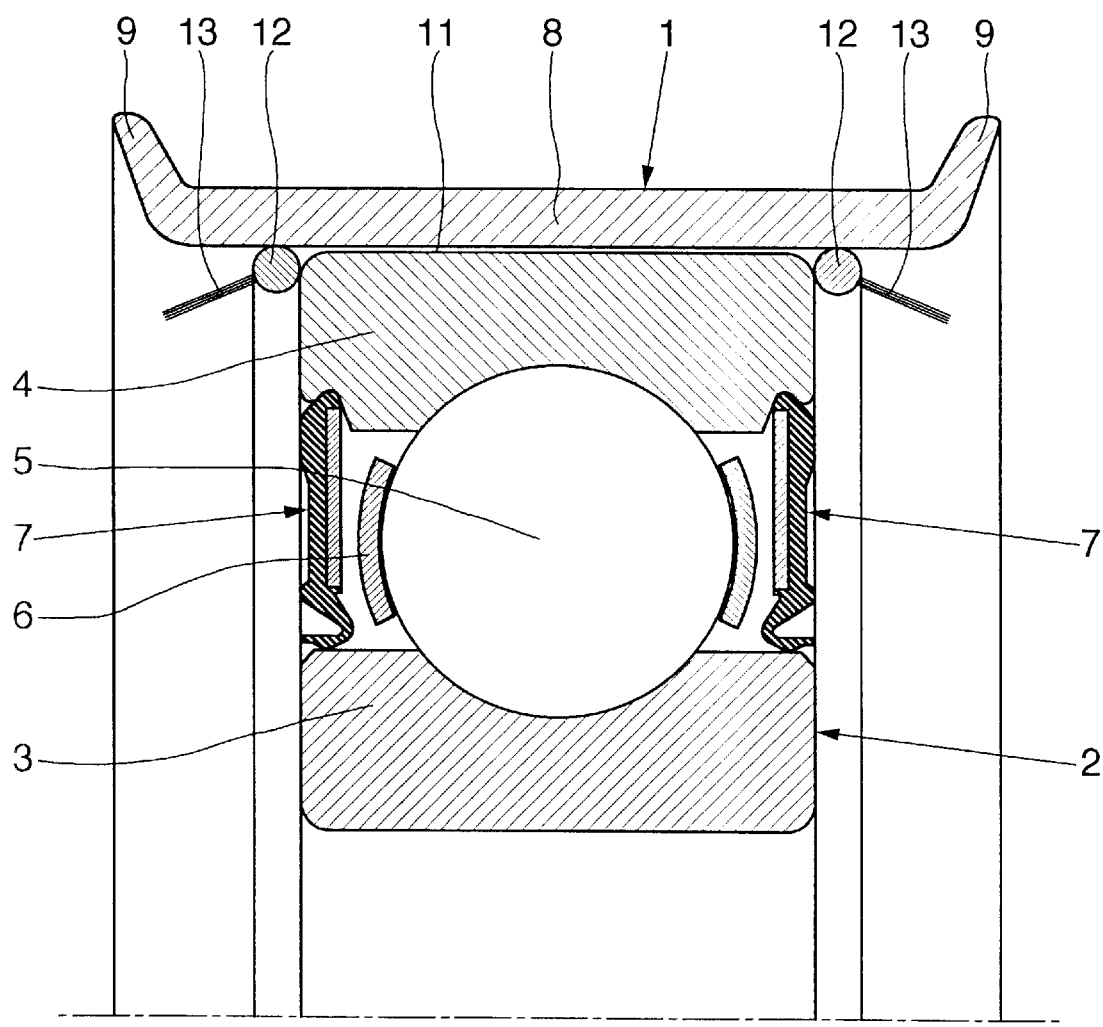
FIG. 2 is a partial view in axial section and to a larger scale showing the pulley with integral bearing from FIG. 1 before the pulley is fastened to the outer race of the bearing.

Referring to FIG. 2, to form the two brazing beads 10 shown in FIG. 1, after mounting the pulley 1 on the bearing 2, a ring 12 of filler metal wire is placed at each end of the interface between the rim and the race, i.e. of the interstice 11, and the filler metal is melted by a concentrated beam 13 of radiation, for example a laser beam or an electron beam. When it has melted, the filler metal 12 spreads and diffuses by capillary action into the interstice 11, filling it at least partially, and fastens the pulley 8 to the race 4 when it cools, as represented by the brazed beads 10 in FIG. 1.

The size of the interstice 11 between the pulley 8 and the outer race 4 of the bearing 2 is intentionally exaggerated in FIGS. 1 and 2. In reality an extremely small clearance is sufficient for the pulley not to apply any force to the race 4 and for the filler metal to be able to diffuse into the interface by capillary action.

Heating by means of a concentrated beam of radiation such as a laser beam has the advantage of achieving highly localized and very fast heating affecting virtually only the filler metal. The increase in the temperature of the bearing race therefore remains sufficiently limited for it not to degrade the metallurgical properties of the race, in particular its hardness.

Figure 3:
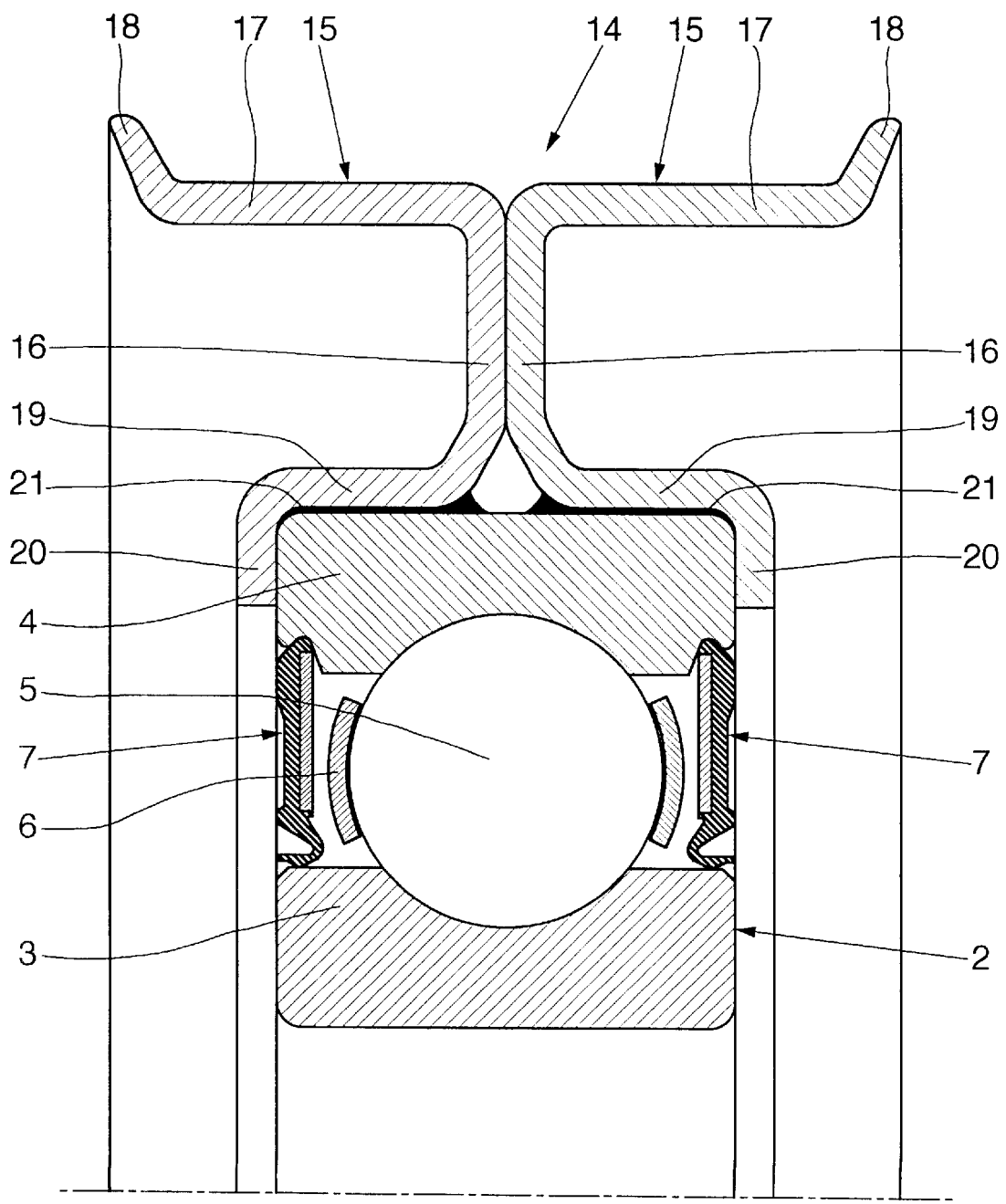
FIG. 3 is a partial view in axial section of a pulley with integral bearing for tensioning a belt, the pulley with integral bearing being manufactured by a method according to the invention and incorporating a pulley in two halves.

The belt tensioning pulley shown in FIG. 3 combines a bearing 2 like that shown in FIG. 1 (inner race 3, outer race 4, balls 5 retained by a cage 6, seals 7) with a pulley 14 made up of two symmetrical half-pulleys 15. Each pressed sheet metal half-pulley 15 has a flat annular part 16 forming a web, a substantially cylindrical outer annular part 17 forming a half-rim and terminating in an outside flange 18 and a substantially cylindrical inner annular part 19 forming a hub and terminating in an inside flange 20, the two halves 15 being mounted on the outer race 4 so that their web parts 16 are in mutual contact. There is no tension in the hub part 19 of each half-pulley 15 when it is mounted on the outer race 4 of the bearing 2 and it is fastened to the race 4 by a brazed joint 21 which, in the example shown, completely fills the interstice 26 between the part 19 of each half-pulley 15 and the outer race 4 (see FIG. 4).

Figure 4:
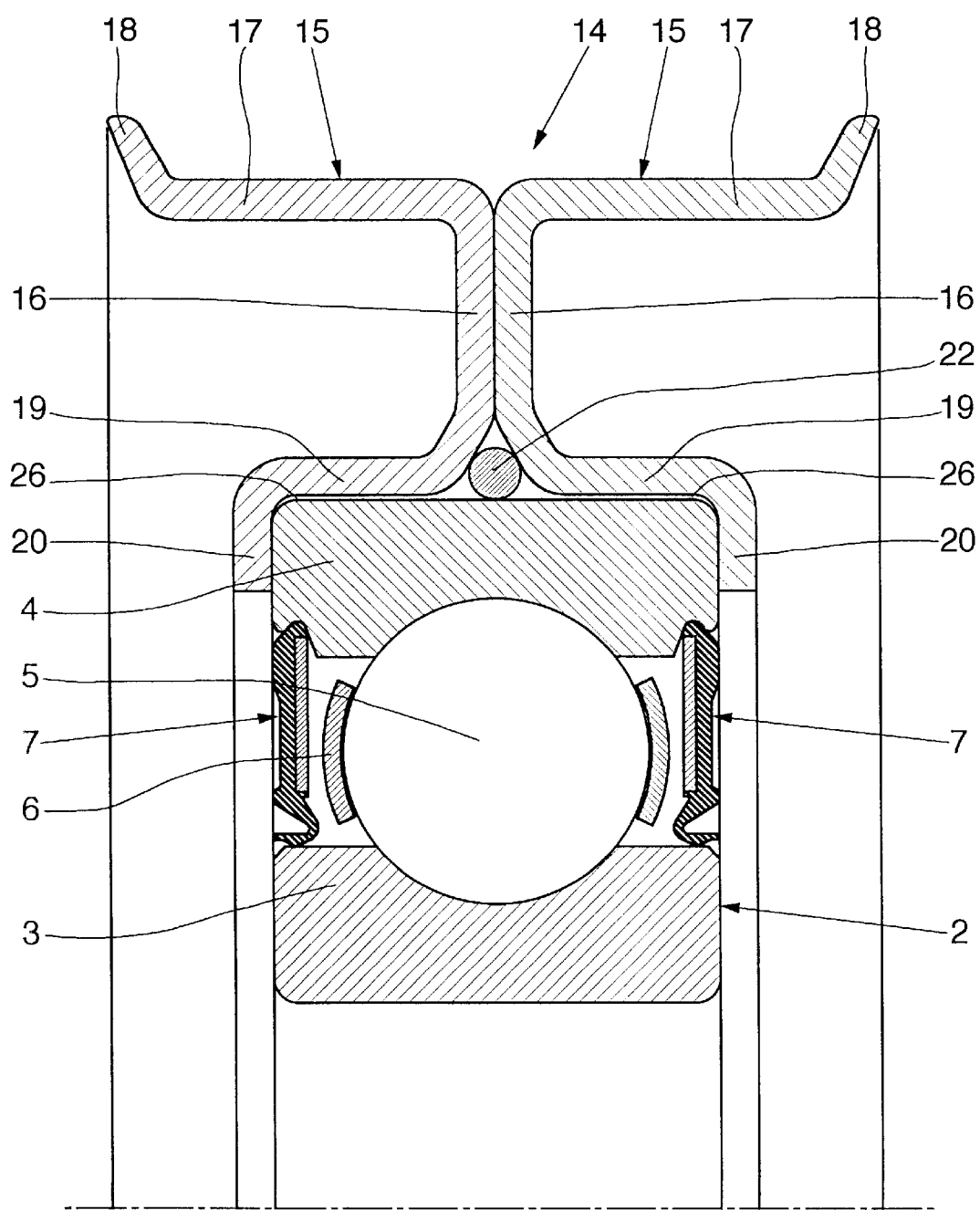
FIG. 4 is a partial view in axial section showing one embodiment of a method of manufacturing the pulley with integral bearing shown in FIG. 3.

As shown in FIG. 4, in the method of manufacturing the belt tensioning pulley with integral bearing shown in FIG. 3, the two half-pulleys 15 are mounted on the race 4 with a ring 22 of filler metal wire between the hub parts 19 of the two half-pulleys 15. The two half-pulleys 15 are then locally heated by a fast induction heating system, not shown, which melts the filler metal 22 which diffuses by capillary action into the interstices 26 between the parts 19 of the half-pulleys 15 and the race 4 and, on solidifying, fastens the half-pulleys 15 to the race 4.

Figure 5:
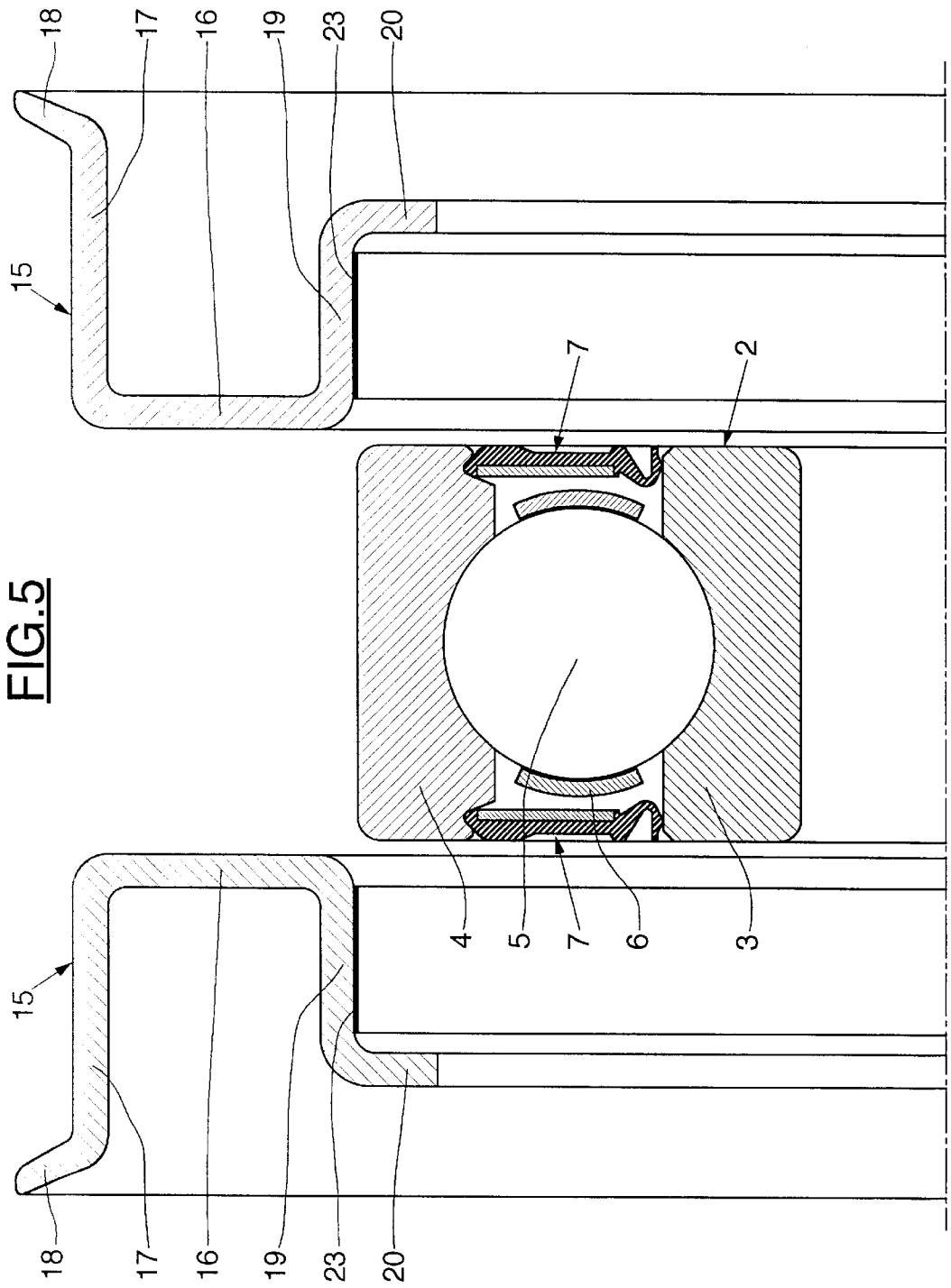
FIG. 5 is a partial view in axial section showing another embodiment of a method of manufacturing the pulley with integral bearing shown in FIG. 3.

FIG. 5 shows another embodiment of a method of fixing two half-pulleys 15 to the outer race 4 of the bearing 2 shown in FIG. 3. Here each half-pulley 15 has a coating 23 of filler metal inside its bore, i.e. on the inside surface of the hub part 19. By locally heating the two half-pulleys 15 using an induction heating system, preferably by means of a tool combining a tool for fitting the two half-pulleys 15 onto the outer race 4 of the bearing 2 and a coil for heating the two half-pulleys 15, it is possible to heat the half-pulleys and to melt the filler metal 23 during the mounting of the half-pulleys 15 on the race 4. The structure shown in FIG. 3 is obtained after the filler metal solidifies.

Figure 6:
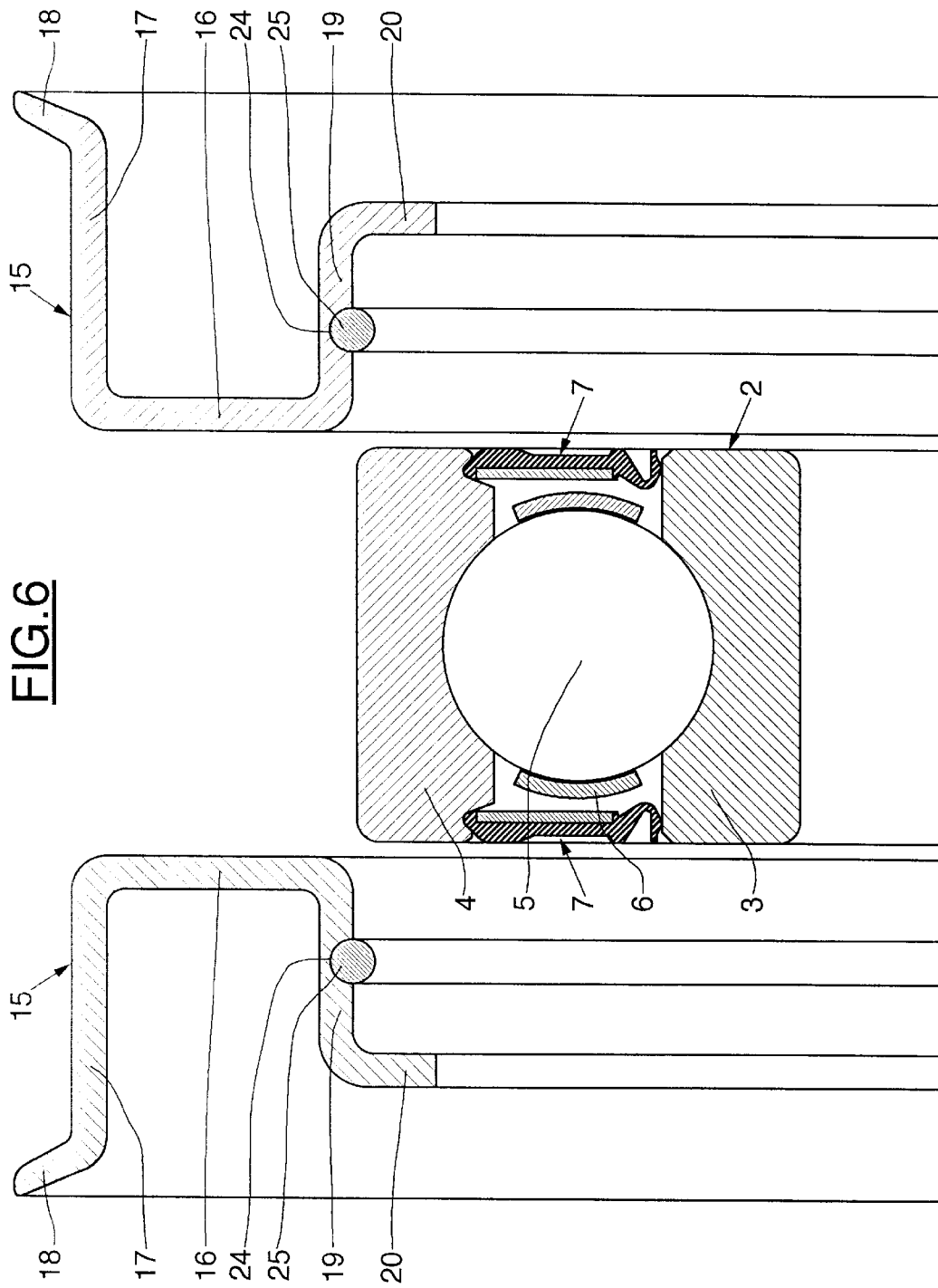
FIG. 6 is a partial view in axial section showing a method of manufacturing a tension pulley with integral bearing including a pulley in two halves.

FIG. 6 shows a variant of a method of manufacturing the belt tensioning pulley with integral bearing shown in FIG. 4. In this variant, each half-pulley has an annular groove 24 on the inside surface of its hub part 19 and which contains a ring 25 of filler metal. The groove has a semicircular profile, for example. Heating the half-pulleys 15 during or after fitting them onto the race 4, preferably using a tool combining a fitting tool and a heating coil, melts the filler metal 25 and causes it to diffuse between the two half-pulleys 15 and the outer race 4 of the bearing.

Although the invention is described above and shown in the accompanying drawings by means of embodiments in which the pulley and the outer race of the bearing are fastened together by brazing with a tin-based filler metal whose melting point (solidus) is equal to at least approximately 180° C. or a silver-based filler metal whose melting point (solidus) is higher than approximately 500° C., it should be noted that such fastening could be achieved by means of other binary, ternary or quaternary filler metal alloys, preferably having a melting point that is relatively low compared to that of the steel from which the pulley and the bearing are made. For example, it would also be possible to use an alloy of tin and silver, for example an alloy comprising 96.5% tin and 3.5% silver with a melting point (solidus) of approximately 220° C., high fluidity and good capillarity.

All these filler metal alloys are well known in the brazing art and in the case of alloys based on tin and/or silver are specified in French standard AFNOR NF A 81-362, for example.

There is claimed:

1. A method of manufacturing a pulley with integral bearing comprising a sheet metal pulley mounted on the outer race of a bearing, in which method said pulley is a close sliding fit on said outer race and a filler metal is melted in the area of an interface between said pulley and said race so that said filler metal diffuses by capillary action into at least part of an interstice between said pulley and said race, at least partly fills said interstice and fastens said pulley to said race when it solidifies.

2. The method claimed in claim 1 wherein said filler metal is an alloy based on tin or silver or an alloy of tin and silver.

3. The method claimed in claim 1 wherein said filler metal is in the form of a coating applied to one of the parts to be fastened together.

4. The method claimed in claim 1 wherein said filler metal is melted by a laser beam or an electron beam.

5. The method claimed in claim 1 wherein said filler metal is melted by induction heating at least one of the parts to be fastened together.

6. The method claimed in claim 1 wherein said filler metal is in the form of brazing wire.

7. The method claimed in claim 6 wherein said filler metal is in the form of a wire ring.

8. The method claimed in claim 7 wherein said wire ring occupies at least one end of said interface between said pulley and said race.

* * * * *